US005658003A

United States Patent [19]
Jensen

[11] Patent Number: 5,658,003
[45] Date of Patent: Aug. 19, 1997

[54] TRAILER SYSTEM

[76] Inventor: Gary Lee Jensen, 41 W. Main St. Box 24, Trenton, Utah 84338

[21] Appl. No.: 548,267

[22] Filed: Oct. 25, 1995

[51] Int. Cl.$^6$ ........................................ B60D 1/40
[52] U.S. Cl. .................. 280/474; 280/491.1; 280/478.1; 16/229; 16/366; 224/314
[58] Field of Search ........................ 280/474, 477, 280/478.1, 479.1, 491.1, 491.3, 479.2, 479.3, 462, 467; 16/229, 231, 366; 224/320, 325, 314

[56] References Cited

U.S. PATENT DOCUMENTS

| | | | |
|---|---|---|---|
| 2,436,228 | 2/1948 | Purchase | 224/314 |
| 2,654,516 | 10/1953 | Edwards | 224/314 |
| 3,201,821 | 8/1965 | Ruckstuhl | 16/366 |
| 4,398,742 | 8/1983 | Sanders | 280/491.3 |
| 4,632,289 | 12/1986 | Morisette | 224/314 |
| 5,188,385 | 2/1993 | Wilson | 280/477 |
| 5,203,582 | 4/1993 | Smyly, Sr. | 280/477 |
| 5,226,657 | 7/1993 | Dolphin | 280/478.1 |
| 5,493,760 | 2/1996 | Takimoto | 16/366 |

FOREIGN PATENT DOCUMENTS

| | | | |
|---|---|---|---|
| 278449 | 3/1966 | Australia | 16/231 |
| 75178 | 5/1894 | Germany | 16/231 |

*Primary Examiner*—Kevin Hurley
*Attorney, Agent, or Firm*—Edward E. McCullough

[57] ABSTRACT

A trailer system has a drawbar that connects to a flat bed via a laterally-swiveling joint. The drawbar has a forward member and an aft member. A clevis structure on the mating-end portion of each drawbar member is formed by two plates fixed to the sides of each drawbar and extending beyond its mating end. The plates on the forward drawbar member are less that half the height thereof and are fixed flush with the upper edge of the drawbar. The plates on the aft drawbar member are similar, and are fixed to the lower half of the drawbar. Aligned holes in the free ends of each pair of plate extensions can be aligned with a hole in the opposite drawbar member. The selection of bolts placed in these aligned holes can make the drawbar rigid for towing (if both bolts are in place), or its two members disconnected (if both bolts are removed), or the drawbar can be made bendable upwardly or downwardly, depending on which set of aligned holes is fastened with a bolt. Since the two sets of plate extensions are parallel to each other, each acts as a stop to limit the rotation of the other drawbar member, so that upward and downward bending of the drawbar are mutually-exclusive, when only one bolt is in place.

20 Claims, 2 Drawing Sheets

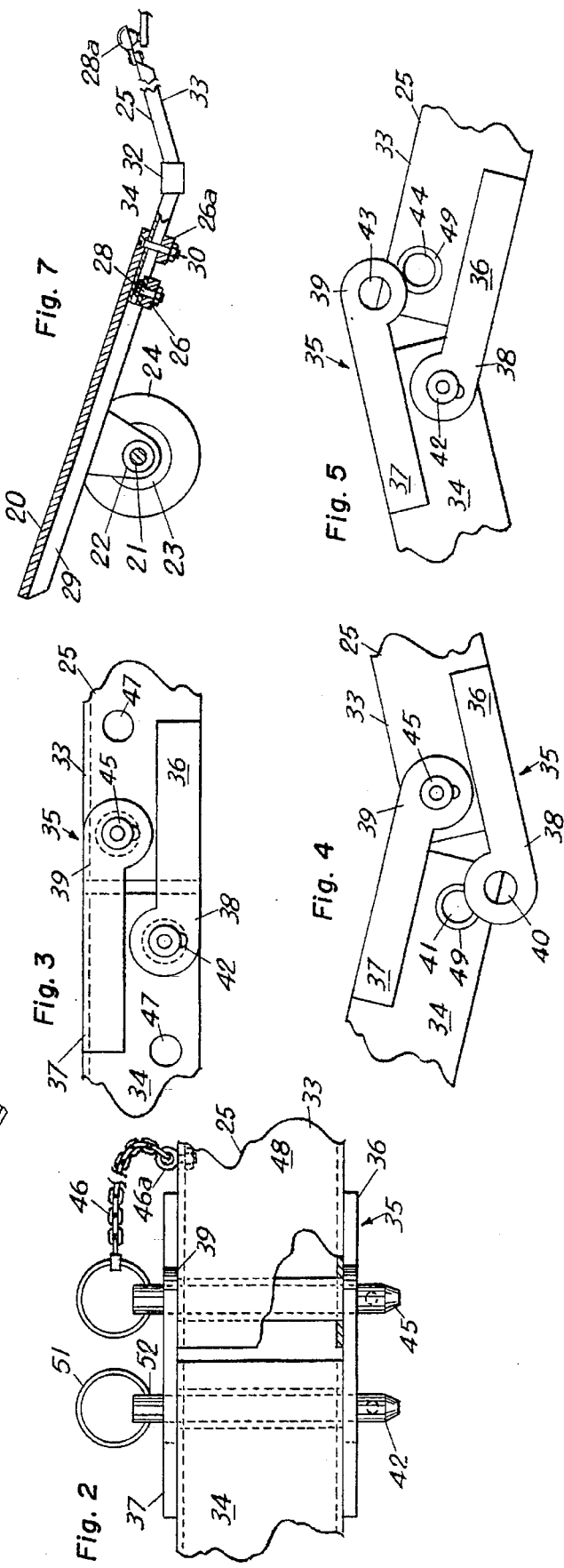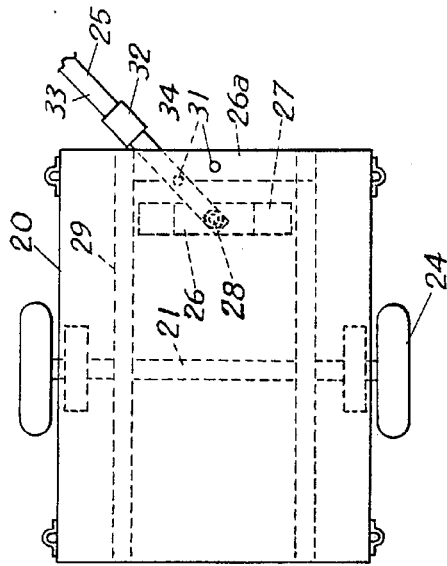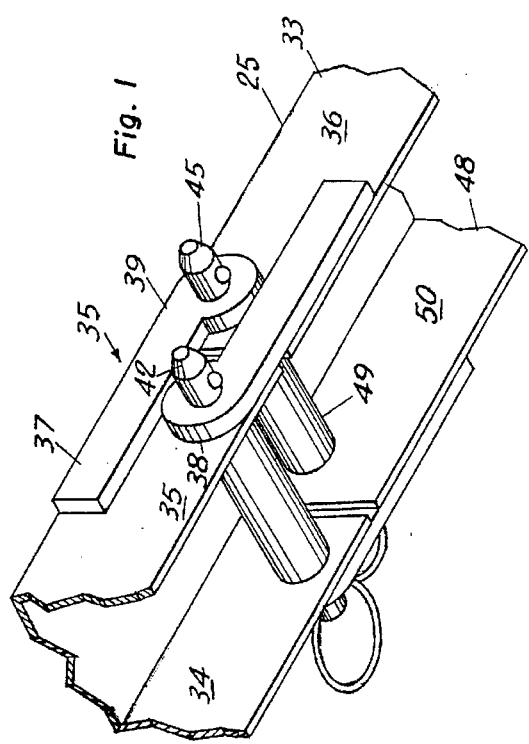

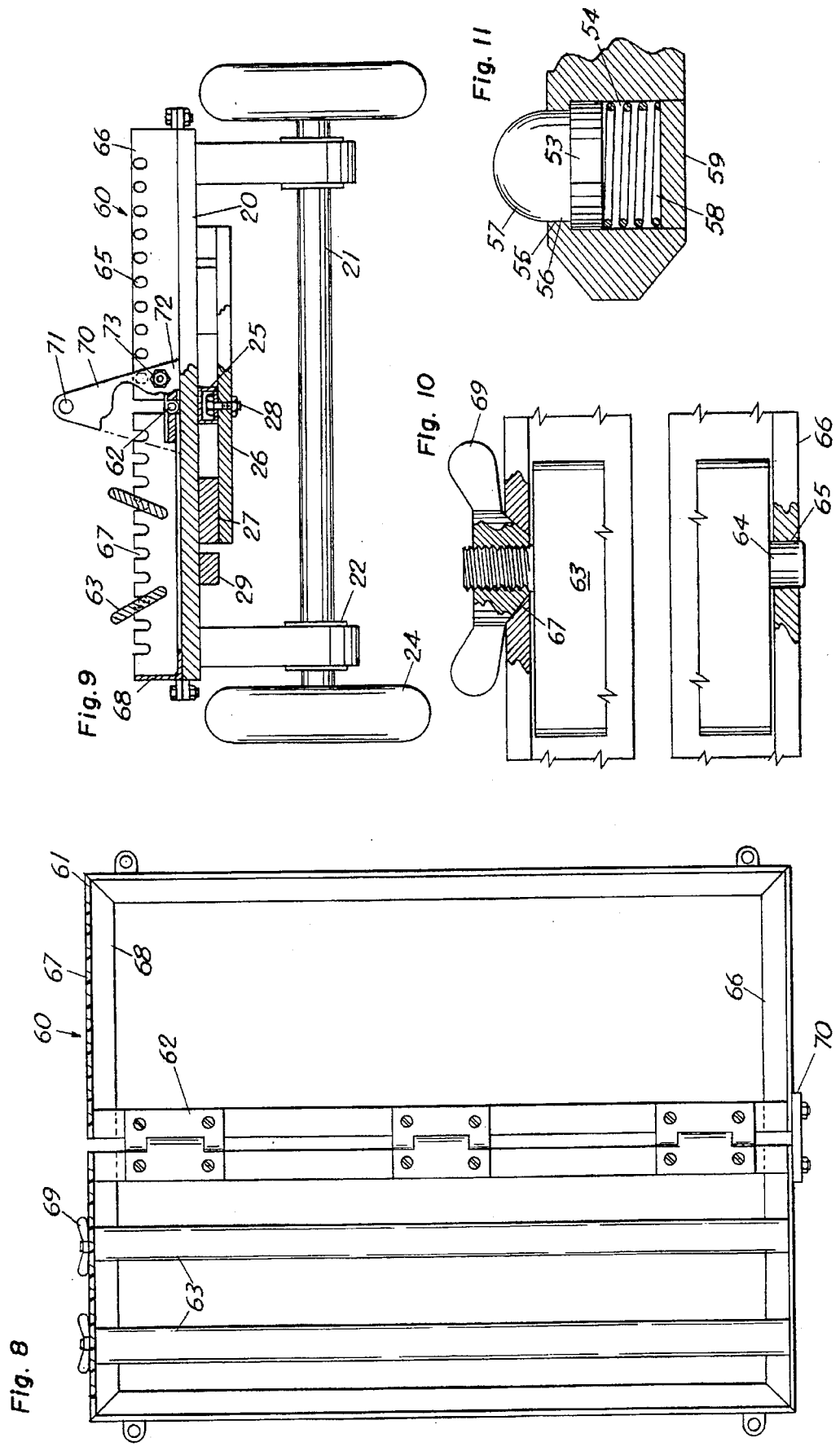

TRAILER SYSTEM

BACKGROUND OF THE INVENTION

1. Field of the Invention

This invention relates to trailers. More specifically, it relates to trailers having tongues or drawbars that have a side-to-side, swiveling attachment to a flat bed, to clear a towing vehicle during loading and unloading of cargo from the front end of the trailer; and a joint in the drawbar that enables the trailer to tilt downwardly at either its front or rear end, so that cargo can easily be loaded or unloaded by one person from the front or rear of the trailer. The invention also includes a novel cargo rack that can be adjusted for carrying various sizes and shapes of cargo items; and a special joint that can allow upward bending of the drawbar, downward bending, rigidity, and separation of the drawbar into two parts.

2. Description of the Prior Art

Trailers having swiveling tongues are known in the prior art, e.g.: U.S. Pat. No. 2,828,029 "Boat Trailer" to R. G. Easley; U.S. Pat. No. 2,582,595 "Adjustable Tongue for Motorless Vehicles" to C. I. Leveke; and U.S. Pat. No. 2,417,646 "Drawbar Unit" to D. E. Hallner.

Also, tilting trailers, and trailers wherein tilting is accomplished by means of joints in drawbars, are also known. Examples of such trailers are taught in U.S. Pat. No. 3,102,649 "Trailer Tilting Apparatus" to F. B. Whalen; U.S. Pat. No. 3,692,362 "Tipping Trailers" to J. B. L. Craske; U.S. Pat. No. 2,534,665 "Lift Tow Hitch" to L. O. Greeley; and U.S. Pat. No. 3,084,954 "Trailer Drawbar Hitch" to E. Schlueter.

However, none of these patents teaches the combination of a laterally-swiveling drawbar with a joint therein that can easily be: (1) restricted to downward bending; (2) restricted to upward bending; (3) made rigid: or (4) separated, as is taught in the present invention. These attributes promote easy loading and unloading of cargo from the front or rear of the trailer, or disconnection of the trailer from a towing vehicle—all by one person.

SUMMARY OF THE INVENTION

A problem with currently-available trailer systems, especially for those intended for hauling small, recreational vehicles, such as powered water skis and snowmobiles, is that the only joint permitting sidewise movement of the trailer is its ball-and-socket "trailer hitch" that connects directly to the towing vehicle. Hence, it is difficult to load and unload such trailers from the front without disconnecting the trailer from the towing vehicle, because the cargo cannot otherwise clear the towing vehicle. Also, a loaded trailer that has been disconnected from the towing vehicle is exceedingly difficult for one person to connect to the towing vehicle; because it requires precision maneuvering of the towing vehicle to position its spherical trailer hitch so that hemispherical connection on the trailer drawbar can be placed over it. Not only must the trailer hitch be precisely positioned, but the drawbar of a loaded trailer is usually heavy and difficult to maneuver.

The present invention is intended to solve these problems of the prior art by providing a trailer system that has a side-to-side swiveling connection between the drawbar and the trailer, as well as the conventional, universal-joint connection with the towing vehicle. In addition, it includes a unique joint, intermediate the ends of the drawbar that, with simple changes in the placements of two pins, can easily disconnect from the towing vehicle. It can also make the drawbar rigid for towing, or it can permit the drawbar to be bent upwardly or downwardly. This joint is designed so that upward or downward bending of the drawbar are mutually exclusive. This is a very valuable feature, because it prevents the weight of an item, loaded from the front of the trailer from raising the front of the flat bed above the horizontal as the item is moved aftwardly on the flat bed, and thus making it more difficult to load the next item. The same is true of items being loaded from the rear of the trailer—in this instance, the joint in the drawbar permits only upward bending of the drawbar, which prevents upward movement of the rear of the flat bed above the horizontal, as the cargo item is moved forwardly on the flat bed.

The invention includes a detachable, foldable, cargo rack that can be attached to the flat bed of the trailer. This cargo rack includes means for adjusting the positions of rotatable, support bars thereon, so that items of cargo can be placed for best use of space on the cargo rack.

A primary object of the invention is to provide a trailer that can easily be loaded and unloaded by one person from either the front or rear thereof without having to disconnect the trailer from a towing vehicle.

Another object of the invention is to provide a trailer system that can easily be connected or disconnected relative to a towing vehicle without having to lift the heavy drawbar off a ball-and-socket joint.

Another object of the invention is to provide a trailer system that can easily be connected to a towing vehicle without precision maneuvering of the vehicles.

Another object of the invention is to provide a trailer system having a removable, adjustable cargo rack that enables convenient loading of a variety of cargo items with the best use of space on the flat bed of the trailer.

Other features and advantages of the invention will be noted, as the following detailed description is read with reference to the drawings, wherein the same parts are designated by the same numbers throughout the disclosure.

BRIEF DESCRIPTION OF THE DRAWINGS

In the drawings:

FIG. 1 is a fragmentary perspective view of the underside of the unique joint of the invention;

FIG. 2 is a top view of the joint shown in FIG. 1;

FIG. 3 is a side view of the same joint;

FIG. 4 is similar to FIG. 3, but shows how removal of one bolt from the joint permits downward bending thereof, to facilitate loading and unloading of cargo from the front of a trailer;

FIG. 5 is similar to FIG. 4, but shows how removal of the other bolt permits upward bending of the joint to facilitate loading and unloading of cargo from the rear of a trailer;

FIG. 6 is a top view of the trailer of the invention;

FIG. 7 is a side view of the trailer, with the drawbar centered, showing how the trailer can be tilted forwardly when a bolt is removed from the joint, as shown in FIG. 4;

FIG. 8 is top view of the cargo rack of the invention;

FIG. 9 is a front view of the trailer, with some parts broken away to show detail;

FIG. 10 is a greatly-enlarged, fragmentary view of one of the cargo-support bars, showing how it engages the front and aft frame members of the cargo rack; and FIG. 11 a greatly-enlarged, sectional view of the end portion of one of the bolts shown in FIGS. 1–5.

DESCRIPTION OF THE PREFERRED EMBODIMENTS

As shown in FIGS. 6, 7, and 9, the invention has a flat bed 20. An axle 21, supporting the flat bed, is journaled in two bearings 22 fastened to the underside of the flat bed. A wheel 23, having a tire 24, is fastened to each end of the axle 21.

A tongue or drawbar 25 is pivotally fastened to a support member 26, having the form of a bar fixed to the underside of the flat bed 20 via two spacers 27. These spacers provide room for the end of the drawbar 25 to fit between the support member 26 and the underside of the flat bed 20. A threaded bolt 28, equipped with a nut, passes through holes in the end portion of the drawbar and in the center of the support member 26 to provide swiveling attachment of the drawbar to the support member. Lateral movement of the drawbar 25 is restricted by two parallel beams 29 that are fastened to the underside of the flat bed and spaced away from its center for longitudinal support thereof. A second support member 26a, also having the form of a bar, is fastened at its end portions to the undersides of the beams 29, forwardly of the support member 26, for additional support of the drawbar 25.

For towing, the drawbar 25 can be fastened into a central position, relative to the flat bed 20, by a pin or bolt 30 that can be passed through aligned holes 31 in the drawbar and the front-end portion of the flat bed. The free-end portion of the drawbar is equipped with the socket portion of a conventional, ball-and-socket trailer hitch 28a, the ball portion of which is fixed to the towing vehicle.

A unique joint 32, intermediate the ends of the drawbar 25, separates it into a forward member 33 and an aft member 34 (FIGS. 1–5. It is indicated as a rectangle in FIGS. 6 and 7). The mating end of each drawbar member 33 and 34 is equipped with a clevis structure 35. These structures are formed by a first pair of (aftwardly-extending) plates 36, fixed to the mating-end portion of the forward drawbar member 33; and a second pair of (forwardly-extending) plates 37, fixed to the mating-end portion of the aft drawbar member 34. The width of each pair of plates 36 and 37 is less than half the height of the drawbar member to which it is fixed, the first pair of plates 36 being fixed to the lower portion of the forward drawbar member 33 and the second pair 37 being fixed to the upper portion of the aft drawbar member 34. This makes it possible for each set of extensions 38 and 39, respectively, of the plates 36 and 37 to embrace the end portion of the opposite drawbar member and be substantially parallel to the pair of plate extensions fixed to that member. The free-end portions of the extensions 38, fixed to the forward drawbar member, are equipped with aligned holes 40 that can be aligned with a hole 41 in the aft drawbar member 34, and the two drawbar members 33 and 34 can be attached together by a bolt 42 inserted into this set of aligned holes. Similarly, aligned holes 43 in the free-end portions of the pair of extensions 39, fixed to the aft drawbar member, can be aligned with a hole 44 in the forward drawbar member 33. A second bolt 45 can then be inserted into the set of aligned holes 43 and 44 to reinforce the attachment of the forward and aft drawbar members. The positions of the plates 36 and 37 on their respective drawbar members can, of course, be reversed, so that the plates 36 are fixed to the upper portion of the forward drawbar member 33 and the plates 37 are fixed to the lower portion of the aft drawbar member 34.

It will be noted that the two pairs of extensions of the plates 36 and 37 are substantially parallel when both bolts 42 and 45 are in their respective holes 41 and 44. Hence, the extensions that are not engaged to a drawbar member with a bolt 42 or 45 can function as a stop means against the plates 36 or 37 on the opposite drawbar member, so that the drawbar 25 can only bend upwardly or downwardly when only one bolt is being used. Therefore, (FIGS. 1–5): (1) When both bolts 42 and 45 are in place, the forward and aft drawbar members are substantially rigidly attached—this is the most useful mode for towing the trailer; (2) When the first bolt 42 is removed and the second bolt 45 left in place (FIGS. 4 and 7), the drawbar 25 can bend downwardly but not upwardly—this is the most useful mode for loading and unloading the trailer from the front; (3) When the second bolt 45 is removed and the first bolt 42 left in place (FIG. 5), the drawbar 25 can bend upwardly but not downwardly—this is the most useful mode when the trailer is to be loaded or unloaded from the rear; and (4) The two members 33 and 34 of the drawbar 25 can be quickly disconnected by the removal of both bolts 42 and 45 from their respective holes in the two drawbar members.

When not engaging the holes 41 or 44, the bolts 42 and 45 are retained to their corresponding drawbar members by small chains 46, each of which is attached at one end to a drawbar member and at its other end to an eye bolt 46a (one chain and eye bolt is shown in FIG. 2). By this means the bolt 42 is attached to the aft drawbar member 34 and the bolt 45 is attached to the forward drawbar member 33. Alternatively, the bolts 42 and 45 may be inserted into storage holes 47, one in each member 33 and 34 of the drawbar 25, when not in use (FIG. 3).

The drawbar members 33 and 34 have the cross-sectional form of channels 48 (FIGS. 1 and 2). Hence, to promote strength of these members, as well as ease of use with the bolts 42 and 45, the holes 41 and 44 are reinforced by tubes 49, that are aligned with the holes and welded to the sides 50 of the channels 48.

The bolts 42 and 45, per se, are known. At one end portion, each of these bolts is equipped with a large ring 51, fitted into a hole 52 in the bolt, to promote ease of handling and to provide a stop means to restrict travel of the bolt into a hole (FIGS. 1 and 2). At its other end portion, each bolt has a piston 53 seated in a cylindrical cavity 54 at right angles to the axis of the bolt (FIG. 11). A hole 55 at one end of the cavity 54 permits the piston shaft 56 to extend through the side of the bolt 42 or 45. The end portion of this shaft 56 is hemispherical, and the shaft 56 is just long enough that only its hemispherical end portion 57 extends beyond the surface of the bolt 42 or 45. Since the piston 53 is larger in diameter than the shaft hole 55, it is not able to escape from the cavity 54. A compression spring 58, confined between the piston 53 and a support plate 59 at the opposite end of the cavity 54 forces the shaft 56 outwardly so that the hemisphere 57 normally extends beyond the surface of the bolt 42 or 45. Thus the hemisphere 57 can function as a keeper or detent means to prevent the bolt 42 or 45 from accidentally backing out of a hole into which it has been inserted. However, it can easily be withdrawn from a hole by manually depressing the hemisphere 57 as the bolt is being withdrawn. Other well-known means of performing this function of retaining a bolt in a hole could be used, such as cotter keys that could engage holes in the end portions of the bolts 42 or 45, or C or E clamps that could engage circumferential grooves in those same end portions.

A cargo rack 60 is constructed of two rectangular frames 61 fastened together, to comprise a pallet, by at least one hinge 62, whereby the cargo rack can be folded for convenient storage. Longitudinal, rotatable, cargo-support bars 63 are used to support items of cargo, such as snowmobiles or boats. A short, central shaft 64, fixed to the end of each bar 63, provides a means of fastening the bars to the forward and aft frame members. The shaft 64 on the forward end of each bar 63 fits into any one of a series of holes 65 in the forward frame member 66. These holes are slightly slotted vertically to promote easy insertion of the shafts 64. The shafts 64a on the aft end of each bar 63 is threaded, and extends into any one of a series of countersunk slots 67 in the aft frame member 68, where it is engaged by a wing nut 69, shaped to fit the countersunk slot. The holes 65 in the forward frame members 66 are directly opposite the vertical slots 67 in the aft frame members 68; and the slots and holes are closely spaced to provide adjustable positions for the cargo-support bars 63, to accommodate cargo items of varying shapes. It should be noted that the holes 65 and slots 67 could be mixed in the same frame member, however, in a preferred embodiment, the holes are in one member and the slots in another, as shown in the drawings. The bars 63 may be covered with carpet material to protect cargo items from being scratched. Although two cargo-support bars 63 are shown in FIGS. 8 and 9, the number of bars used depends on the nature of the cargo.

A removable tie bar 70 essentially has the form of an isosceles triangle—its upper, central portion, or support member, having an eye 71 for securing the bow of a boat with a cable (FIGS. 8 and 9). The lower portion 72 of the tie bar 70 has two holes 73, whereby it is fastened to the cargo rack 60 by screws and nuts 74, that pass through the holes 73 and aligned holes in the forward frame members 66 thereof. Although one tie bar 70 is shown, any number of them can be used, depending on the nature of the cargo.

To practice the invention the following simple steps are taken: (1) If the trailer is to be loaded from the front, the towing vehicle is turned so that it is at an angle to the trailer sufficient for cargo items being placed on the trailer to clear the towing vehicle; (2) The bolt 42 is removed from its hole 41 in the aft drawbar member, allowing the trailer to be tilted forwardly; (3) The cargo-support bars 63 are then placed as desired in the cargo rack and secured with the wing nuts 69; (4) The cargo is loaded and tied to the cargo rack with cables in a conventional manner; and (5) The bolt 42 is then replaced in its hole 41, so that the two drawbar members are rigidly aligned for towing. If the trailer is to be loaded from the rear, the bolt 45 is removed from its hole 44 in the forward drawbar member, the trailer is tilted aftwardly, the cargo is loaded and secured in the same manner, and the bolt 45 is then replaced in its hole 44 so that the drawbar is once again rigid for being towed. In unloading the cargo from the front or rear of the trailer, the above procedures are repeated, except that the cargo items are removed from the trailer, rather that loaded onto it; and the bolt 42 or 45 that has been removed for tilting the trailer does not need to be replaced in its hole 41 or 44.

Although the preferred embodiments of the invention have been described in detail, it should be noted that many details may be altered without departing from the spirit and scope of the invention, as it is defined in the following claims.

I claim:

1. A trailer system for easy forward and aft loading and unloading of cargo comprising:

a bed;

axle means supporting the bed and attached thereto;

wheels on the end portions of the axle means;

drawbar means pivotally attached to the bed for lateral movement;

means on the free-end portion of the drawbar means for fastening it to a towing vehicle for pivotal motion in at least a vertical plane; and joint means intermediate the ends of the drawbar means for selectively allowing the drawbar means to bend upwardly and downwardly, for making it rigid, and for separating it into two parts.

2. The system of claim 1 wherein the drawbar means has a forward member and an aft member, and wherein the joint means comprises: a clevis structure on the mating-end portion of each of said drawbar members, one clevis structure being fixed to the upper portion of its drawbar member, and the other being fixed to the lower portion of its drawbar member, so that each can fit over the portion of the mating end of the drawbar that is not occupied by the clevis structure thereon, and wherein, when fitted together so that both members of the drawbar are aligned longitudinally, the engaged end portions of the drawbar members define at least two holes, each of which penetrates both a clevis structure and the mating end portion of the other drawbar member; and wherein the joint means further includes bolt means for joining said forward and aft drawbar members that can be fitted into said holes, whereby said drawbar means is rigid when the bolt means is inserted into each set of said holes, it can bend upwardly and downwardly when the bolt means is inserted into only one of set of said holes, and it can be separated into two parts when neither set of holes has a bolt means in it.

3. The system of claim 2 further including stop means on the mating-end portion of at least one drawbar member for restricting vertical movement of the other drawbar member in one direction.

4. The apparatus of claim 2 wherein said clevis structure is formed by two parallel plates, one fixed to each side of the mating portion of each drawbar member and extending beyond the end thereof, one pair of plates being fixed to the upper portions of the sides of its respective drawbar member and the other being fixed to the lower portions of the sides of its drawbar member, so that the two pairs of plates are substantially parallel when the two drawbar members are longitudinally aligned, whereby the portion of each plate that is fixed to a drawbar functions as a stop means to restrict vertical motion of the extension of the plate fixed to the other drawbar member, so that upward and downward bending of the drawbar are mutually exclusive when only one bolt means is engaging one of said holes.

5. The system of claim 2 wherein the bolt means includes: stop means, transversely larger than said bolt and fastened to one end thereof; and means for retaining the bolt in one of said holes in a drawbar member, after it has been inserted therein.

6. The system of claim 5 wherein the means for retaining said bolt means in a hole comprises: detent means for preventing accidental removal of the bolt attached to the end portion of said bolt opposite the stop means; and spring means for forcing the detent means outwardly from the surface of the bolt for temporary enlargement of the diameter of a portion of the bolt.

7. The system of claim 6 wherein the detent means comprises: a piston, seated in a cylindrical cavity defined perpendicularly in said bolt, having a short shaft with a substantially hemispherical outer-end portion that extends through a hole defined in the side of the bolt; a compression spring in the cavity that bears against the piston to force the hemispherical end outwardly from the surface of the bolt; and support means, against which the opposite end of the compression spring bears.

8. The system of claim 2 further including means on the drawbar for retaining the bolt means thereto, when it is not being used to engage one of said holes.

9. The system of claim 8 wherein the means for retaining the bolt means to the drawbar comprises a small chain attached at one end to one of said drawbar members and at the other end to said bolt means.

10. The system of claim 8 wherein the means for retaining the bolt means to the drawbar comprises at least one storage hole defined in one of the drawbar members, for insertion of the bolt means therein when it is not being used to engage one of said sets of holes in a clevis structure and drawbar member.

11. The system of claim 1 further including a cargo rack attached to said trailer bed, comprising: pallet means for securing cargo to the trailer bed; means for folding said pallet means; and means for adjusting the pallet means to accommodate cargo of varying shapes and sizes.

12. The system of claim 11 wherein the pallet means comprises: at least two rectangular frames; and at least one hinge joining said frames together so that they are foldable for easy storage.

13. The system of claim 12 wherein said frames have forward and aft frame members; and further including at least one cargo-support bar extending between said forward and aft frame members, having a short shaft fixed to each of its ends, and said forward and aft frame members defining holes and slots into which the short shafts are journaled for rotation of the cargo-support bars.

14. The system of claim 13 wherein the holes and slots are closely-spaced in their frame members, so that the positions of the cargo-support bars can be adjusted to accommodate cargo items of varying sizes and shapes.

15. The system of claim 12 further including a tie bar for attaching the bow of a boat to said cargo rack, comprising a support member defining an eye for attaching a boat thereto; and means for fastening the support member to said cargo rack.

16. A joint, especially adapted for use in the drawbar of an easy loading and unloading trailer for hauling small, recreational vehicles, the drawbar having a forward member and an aft member, comprising: a clevis structure on the mating-end portion of each of said drawbar members, one being fixed to the upper portion of its drawbar member, and the other being fixed to the lower portion of its drawbar member, so that each can fit over the portion of the mating end of the drawbar that is not occupied by the clevis structure thereon, and wherein, when fitted together so that both members of the drawbar are aligned longitudinally, the engaged end portions of the drawbar members define at least two sets of aligned holes, each of which penetrates both a clevis structure and the mating-end portion of the other drawbar member; and wherein the joint means further includes bolt means that can be fitted into said sets of holes, whereby said drawbar means is rigid when the bolt means is inserted into each of said sets of holes, it can bend upwardly and downwardly when the bolt means is inserted into only one of said sets of holes, and it can be separated into two parts when neither set of holes has a bolt means in it.

17. The joint of claim 16 further including stop means on the mating-end portion of at least one drawbar member for restricting vertical movement of the other drawbar member in one direction.

18. The joint of claim 16 wherein said clevis structure is formed by two parallel plates, one fixed to each side of the mating portion of each drawbar member and extending beyond the end thereof, one pair of plates being fixed to the upper portions of the sides of its respective drawbar member and the other being fixed to the lower portions of the sides of its drawbar member, so that the two pairs of plates are substantially parallel when the two drawbar members are longitudinally aligned, whereby the portion of each plate that is fixed to a drawbar functions as a stop means to restrict vertical motion in one direction of an extension of a plate fixed to the other drawbar member, when only one bolt means is engaging one of said set of aligned holes in a drawbar and clevis structure.

19. The joint of claim 16 wherein the bolt means includes: stop means, transversely larger than said bolt shaft and fastened to one end thereof; and means for retaining the bolt in one of said holes in a drawbar member, after it has been inserted therein.

20. The joint means of claim 19 wherein the means for retaining said bolt in a hole comprises: a piston seated in a cylindrical cavity defined in said bolt, perpendicular to the axis thereof, said piston having a shaft extending through a hole defined in the side of said bolt, concentric with said cavity, said shaft having a substantially-hemispherical outer end; support means in the cavity opposite said hole; and spring means bearing against the piston and support means to force said hemispherical end beyond the outer surface of the bolt.

\* \* \* \* \*